Dec. 5, 1967 H. E. GAUSS ETAL 3,355,985
DUAL PROPELLANT LAUNCH FOR SOLID ROCKETS
Filed March 17, 1964 2 Sheets-Sheet 1
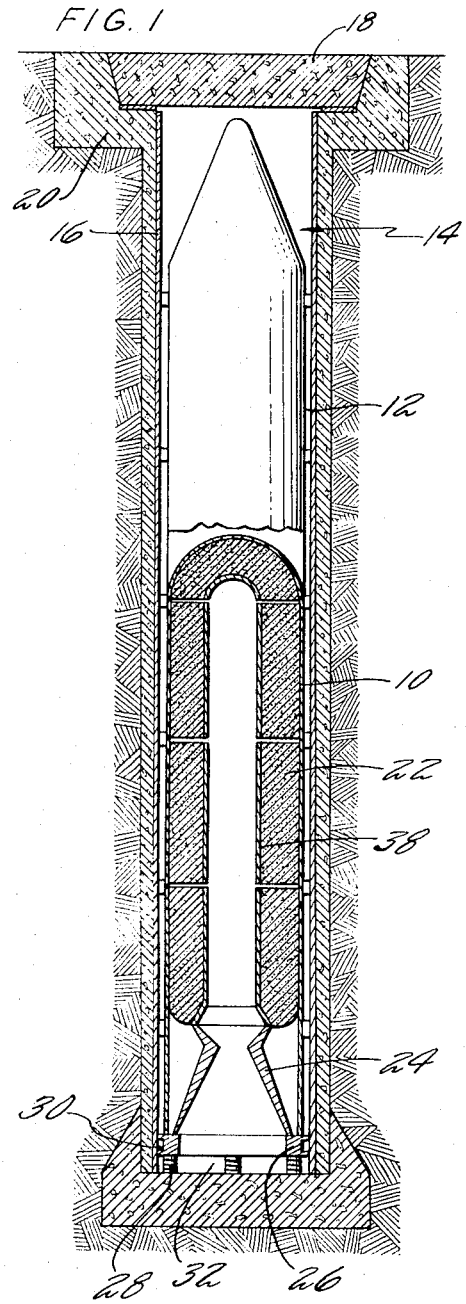
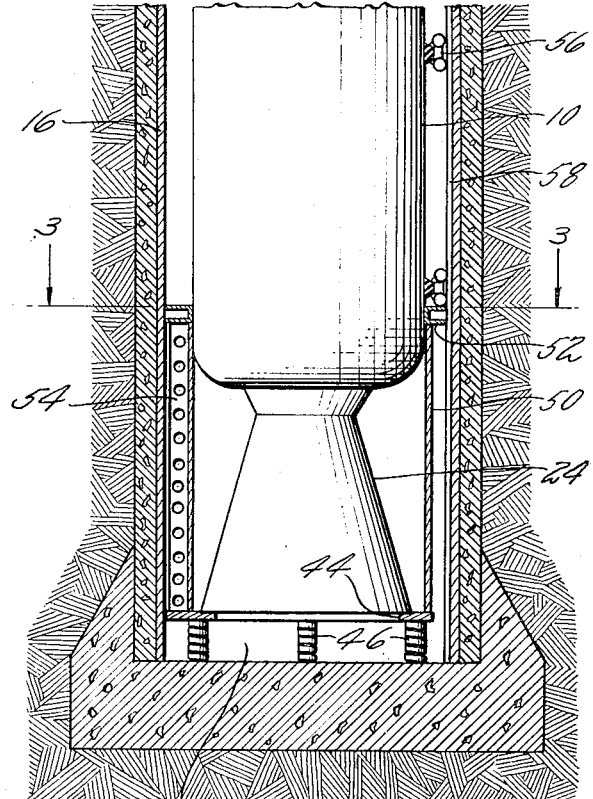
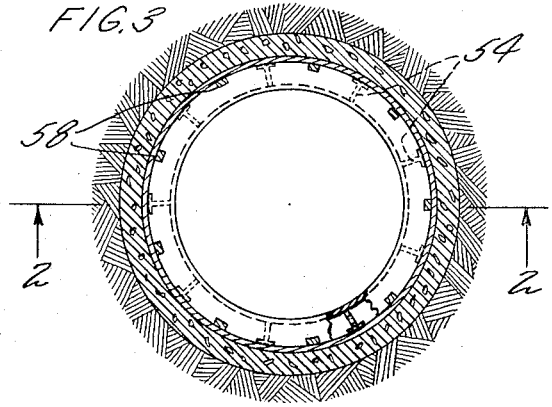
INVENTORS
HUGO E. GAUSS
EDWARD N. HALL
BY Donald J. Bradley
ATTORNEY Dec. 5, 1967  H. E. GAUSS ETAL  3,355,985
DUAL PROPELLANT LAUNCH FOR SOLID ROCKETS
Filed March 17, 1964  2 Sheets-Sheet 2
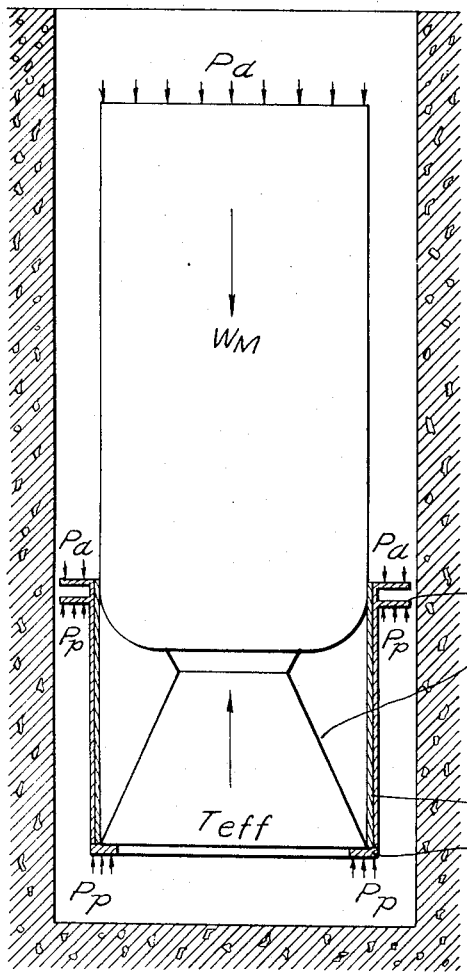
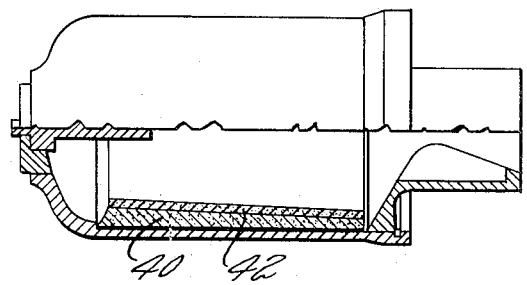
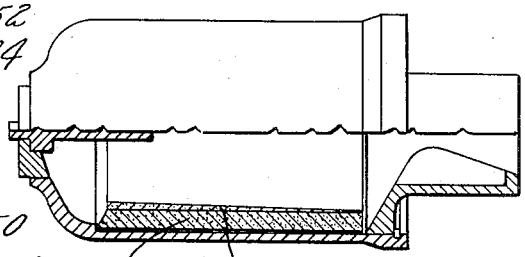
INVENTORS
HUGO E. GAUSS
EDWARD N. HALL
BY Donald J. Bradley
ATTORNEY

United States Patent Office 3,355,985
Patented Dec. 5, 1967

3,355,985
DUAL PROPELLANT LAUNCH FOR SOLID ROCKETS
Hugo E. Gauss, Hartford, and Edward N. Hall, Bloomfield, Conn., assignors to United Aircraft Corporation, East Hartford, Conn., a corporation of Delaware
Filed Mar. 17, 1964, Ser. No. 352,458
3 Claims. (Cl. 89—1.816)

This invention relates in general to the launching of rockets, and in particular to a novel means for launching a rocket from an enclosure such as a tube or a silo.

In the past, two general approaches have been used to launch rockets. The first method, and the one generally used for launching large booster rockets, is called the open-breech method where the exhaust gases produced by the rocket motor after ignition pass freely to the surrounding atmosphere. This approach has also been described as a "hot" launch. Hot launches usually take place from a launching pad or platform at ground level. Some launches, however, have been made from pits or silos beneath ground level. Hot launches from enclosed silos create problems because of the tremendous heat and vibration which occur in the confined spaces. To successfully launch a rocket by this method from an underground silo requires that the diameter of the silo be at least twice the diameter of the rocket booster itself in order to provide sufficient space for expansion of the combustion gases.

The second general method of launching rockets is that of closed-breech which is used under conditions which prevent the use of open-breech launchers, particularly in tank turrets, submarines and like installations. Such launchers usually involve a uniform diameter launcher tube wherein a rocket is initially positioned with its trailing end immediately adjacent the closed breech of the launcher tube. A hot launch of large rockets from an enclosed tube or enclosed silo is extremely difficult because of the heat, pressure and vibration set up within the tube. Consequently, most closed-breech launches utilize other systems to force the rocket out of the silo or tube, and then ignite the rocket as it leaves the tube. A problem with this procedure is that it is difficult to control the rocket until thrust is developed after ignition. No thrust vector control is possible as the rocket is forced from the tube. Furthermore, additional equipment is required to force the rocket out of the tube prior to ignition. Typical systems in use are pneumatic, hydraulic, catapult and gas generator. In some systems a piston or cylinder is used to force the missile from the tube. In other cases the silo itself is the cylinder. Many systems use the gas generator approach in which steam, compressed air, or some other gas is forced into the plenum chamber below the rocket to force the rocket from the tube. Some systems propose to utilize a propellant charge in the base of the tube or silo to produce the necessary gas pressure. With the gas generator approaches, some means of sealing between the rocket case and the wall of the tube is required to prevent the generated gases from escaping and to build up the required pressure in the plenum chamber.

This invention overcomes many of the difficulties of the prior art by utilizing a dual propellant first stage in the rocket. Ejection of the rocket from the silo or tube is accomplished by the pressurization of the silo volume beneath a sabot. A secondary rocket fuel which is cool burning produces the gas necessary for pressurization of the plenum chamber, and a seal is used to control leakage of the gas between the rocket frame and the sides of the silo or tube. After exhaustion of the cool burning secondary propellant, the primary propellant is automatically ignited by secondary propellant burn-through as the rocket leaves the silo or tube, thus eliminating problems of ignition when the rocket is forced from the tube, and allowing thrust vector control immediately upon ejection of the rocket.

The invention will be described in relation to a solid-propellant rocket in which the secondary or cool burning propellant is bonded directly to the primary propellant, and in which ignition of the primary propellant occurs immediately upon burn-through of the secondary propellant.

It is therefore an object of this invention to provide a novel launch method for tube or silo contained rockets in which a secondary propellant is used to pressurize the volume beneath the rocket and eject the rocket from the silo.

Another object of this invention is a novel launching method for solid-propellant rockets in which a secondary propellant is bonded to the primary propellant.

A further object of this invention is a novel method for launching solid-propellant rockets from an enclosed tube in which a secondary propellant is bonded to the primary propellant to thereby produce gas pressure in the plenum chamber beneath the rocket, and in which sealing means are used between the rocket body and the tube to control escape of the gas.

Another object of this invention is a novel method for launching rockets from an enclosure in which thrust vector control is possible immediately upon ejection of the rocket from the enclosure.

These and other objects and a fuller understanding of the invention may be had by referring to the following description and claims, read in conjunction with the accompanying drawings, in which:

FIGURE 1 shows a silo-contained solid propellant rocket embodying this invention;

FIGURE 2 shows in detail the lower section of a rocket having a different sealing means;

FIGURE 3 shows the detail of the sealing means of FIGURE 2;

FIGURE 4 shows one arrangement of bonding the secondary propellant to the primary propellant;

FIGURE 5 shows another arrangememnt of bonding the secondary propellant to the primary propellant; and FIGURE 6 is a schematic diagram of the forces which act upon a rocket utilizing this invention.

Referring now particularly to FIGURE 1, a rocket having a first or booster stage 10 and a second stage 12 is enclosed within a silo 14. Silo 14 comprises a liner 16 and a cover 18. The entire silo including the liner may be imbedded in concrete as shown generally at 20. Shown within the first or booster stage of the rocket 10 is the primary propellant 22 which, when ignited by means well known, burns rapidly to create gases which generate thrust as they exit through nozzle 24. The entire rocket sits on a circular or ring-shaped sabot 26, which is in turn supported by a series of shock mounts 28 which extend between sabot 26 and the floor of the silo. Attached to the outside circumference of sabot 26 is a seal 30, shown here as a labyrinth-type seal. As will be described later, other types of seals may be used. The purpose of the sabot ring 26 is to take the force of the pressures between the nozzle and the silo wall and transfer them to the rocket. The auxiliary function of the sabot ring is to seal the gases in the plenum chamber 32. The gases from the burning propellant are ejected through nozzle 24 and through the hole at the center of sabot ring 26 into plenum chamber 32. Seal 30 seals the plenum chamber 32 and controls the escape of gases from the chamber. The gases act upon the sabot ring 26 and as the gases expand the sabot rises with the missile thereby ejecting the missile from the silo. The sabot leaves the missile at the upper end of the silo by a catch (not shown) which stops the motion of the sabot. The majority of the force required for ejection is derived from the plenum pressure loads. Thrust due to mass flow from the nozzle usually contributes a small percentage of the lifting force.

The size and construction of the sabot are not critical, requiring only sufficient strength to withstand the imposed loadings while in the tube or silo. In addition, the hole at the center of the ring-shaped sabot must not restrict the flow of gases from nozzle 24. The sabot clearance from the silo wall should be greater than the seal clearance to assure that choked flow is attained at the seal.

The design of the seal 30 for the specific application illustrated in FIGURE 1 is influenced by rattle-space requirements. A labyrinth type of seal, well known in the art, is preferred because the clearance between the seal and the silo wall is not critical, a one-inch clearance being tolerable in the application illustrated. The principle of the labyrinth seal in reducing leakage is based on the loss of kinetic energy produced by each throttling across a seal lip so that the pressure ratio across the last throttling is less than the overall pressure ratio, thereby reducing the leakage. The number of seal lips, and the thickness of the seal lip will depend upon the plenum pressure and allowable seal leakage.

The primary propellant 22 may be any one of a number of well-known propellants. A typical primary propellant burns at a temperature of approximately 6,000 degrees. The heat and forces generated by a typical primary propellant create insurmountable temperature, pressure and acoustical problems in ejecting a large rocket from a confined enclosure. For example, the exhaust gases may impose excessive heating of rocket components. Acoustical pressures associated with high mass flow at high temperatures and velocities may damage rocket components. Excessive gas pressure can damage rocket walls.

To overcome these problems, a secondary propellant such as ammonium nitrate or ammonium perchlorate, illustrated at 38, is bonded to the primary propellant. Bonding techniques are well known. The secondary propellant can be cast on the primary propellant, or it may consist of a sheet propellant bonded onto the primary propellant. The only requirement of the secondary propellant is that it be a cold-burning propellant, many such propellants burning at approximately 2500°. This type of propellant has a low flame temperature, a low burning rate, small variation of burning rate with combustion pressure, and compatibility with most primary propellants. Alternatively, a single propellant may be developed with burning characteristics which vary as the propellant is consumed, thereby making possible the use of a single propellant change for this application. If a separate secondary propellant is used, the secondary propellant may be mated to the primary propellant segments on their inner surfaces. Any configuration of propellants, such as star shaped, may be used.

Ignition of secondary propellants is accomplished conventionally or by an aft-mounted rocket-type igniter (not shown) located so that the igniter nozzle exit and the main engine throat coincide. This affords initial ignition at the head end of the combustion chamber. Ignition of the primary propellant will be accomplished when the secondary propellant burns throgh. An advantage of this scheme is that the igniter may be silo or tube retained eliminating weight from the rocket. FIGURES 4 and 5 show two different secondary propellant configurations. FIGURE 4 shows a secondary propellant grain of constant thickness. Both primary grains 40 and secondary grains 42 are slanted. The slanted surfaces allow one tapered mandrel to be used for casting both propellants. The modification shown in FIGURE 5 shows a constant thickness primary propellant 40' with a tapered secondary propellant 42' that will allow gradual ignition of the primary propellant. Numerous other configurations may be used depending upon the application and environment, and upon the primary and secondary propellants used. For example, a single propellant having graduated burning characteristics may be used to provide the cold gases initially and then providing increased thrust as continued burning takes place.

FIGURES 2 and 3 show in detail a modified sabot and seal which may be used instead of the ring-shaped sabot of FIGURE 1. The first or booster stage 10 of the rocket is shown mounted within the silo 16. The bottom end of the rocket including the nozzle 24 rests upon sabot 44 which in turn sits upon a plurality of support structures 46. As in FIGURE 1, the sabot 44 is ring-shaped and functions to support the rocket while it is resting in the silo. Connected to sabot 44 as for example by welding is a ribbed metal sleeve 50 which extends upwardly and completely surrounds the lower portion of the rocket and ends in a seal 52 at a point above nozzle 24. A plurality of ribs 54 are spaced circumferentially about the sleeve 50 in order to strengthen the sleeve. The seal 52 may be any known type of seal to reduce and control escape of the gases from plenum chamber 48. As previously, a labyrinth type of seal is preferred.

Shown also in FIGURE 2 are a plurality of horizontal shock isolaters 56 mounted within a plurality of guide rails 58 to protect the rocket from forces such as bomb blasts within the vicinity of the silo.

The ribbed sleeve 50 is subjected to two loads, the gas pressure and a direct tensile load with buckling from the gas pressure being the critical load. For purposes of strength it is therefore preferable to fabricate the entire sabot seal from one unit.

FIGURE 6 is an analysis of the forces acting upon the sabot-seal combination of FIGURE 2. The downward acting forces are the weight of the missile $W_M$ and ambient pressure $P_a$. The forces acting to raise the missile out of the silo are the motor thrust, $T_{eff}$, and the pressure within the plenum chamber $P_P$. The forces act on the sabot 44 and the lower portion of the seals 52.

The location of the seal shown in FIGURES 2 and 6 is predicated on isolation of the thrust vector control and associated equipment from mechanical vibration and acoustic noise associated with the high velocity flow through the seal 52. The thrust vector control equipment is extremely sensitive, and is normally located immediately adjacent nozzle 24. For typical thrust vector control equipment, see U.S. Patent 2,943,821, entitled "Directional Control Means for a Supersonic Vehicle" in the name of A. E. Wetherbee, Jr., and assigned to the same assignee. By use of sleeve 50 to connect seal 52 with sabot 44, the seal with its consequent vibration and acoustic noise is removed from the vicinity of the thrust vector control equipment, and damage to this equipment is consequently avoided.

As seen in FIGURE 6, the edges of the seal 52 form two successive throats. A Mach number of 1, choked flow, will be reached at the seal, and the flow will be subsonic in the free volume between the silo wall and the missile. A normal shock or a series of expansion fans and oblique shocks may form after the seal without damage to the rocket.

Other types of sabots and sealing arrangements may be used in addition to those described herein to practice the invention. For example, the sabot and seal may be combined into one piece and attached circumferentially about the rocket at any location along the axis of the rocket. There are however obvious disadvantages to this approach in that the seal must be attached to the rocket and may add unacceptable loads. The approach disclosed herein, that is the placement of the sabot beneath the rocket, appears to be optimum.

Nor is this invention limited to the use of only two propellants. For other applications it may be desirable to fabricate a series of layers of propellants, each differing in the amount of cold gas generated and in the amount of thrust delivered to the rocket, or a graduated propellant.

While the invention has been described in terms of a large solid-propellant rocket, the concept may also be applied to a liquid rocket in which a cool-burning secondary propellant or reduced fuel flow is used to generate gas pressure. In addition, any size rocket may be adapted to the method taught herein.

Other modifications of the structure may be made without departing from the scope of the invention as hereinafter claimed.

We claim:

1. Apparatus for launching a rocket from an enclosed silo comprising a rocket positioned within an enclosed silo, said silo being cylindrically shaped with an open end and a closed end and having a closed outer wall of substantially constant circular cross section along the length of the outer wall, said outer wall being positioned in close proximity to the outside of said rocket, said rocket having a nozzle at one end thereof, said nozzle being situated at the closed end of said silo, a primary propellant encased within said rocket for providing thrust thereto, a ring-shaped sabot mounted within the closed end of said silo and adapted to support said rocket, said sabot being positioned at a distance from the closed end of said silo whereby a chamber is formed at the closed end of said silo, sealing means connected about the periphery of said sabot extending laterally from said sabot and terminating adjacent the outer wall of said silo to substantially seal said chamber, said sealing means comprising a labyrinth type seal forming at least two successive throats which create pressure drops across said seal whereby choked flow is produced, a secondary propellant having a lower burning temperature than said primary propellant encased within said rocket, means for igniting said secondary propellant, and means for directing the low temperature gases produced by the burning of said secondary propellant into said chamber, said sealing means controlling the expansion of said gases whereby said sabot and said rocket are forced toward the open end of said silo.

2. Apparatus as in claim 1 in which said primary and secondary propellants are solid fuel propellants, and wherein said secondary propellant is bonded to said primary propellant whereby said primary propellant is automatically ignited upon burn-through of said secondary propellant.

3. Apparatus as in claim 1 in which said ring-shaped sabot includes a sleeve portion extending for a distance longitudinally along and completely surrounding said rocket, said sealing means being connected about the periphery of said sleeve portion.

References Cited

UNITED STATES PATENTS

| 2,715,874 | 8/1955 | Hablutzel et al. | 102—93 |
| 2,892,409 | 6/1959 | Lyon | 102—49 |
| 2,998,754 | 9/1961 | Bialy | 89—1.7 |
| 3,031,969 | 5/1962 | Collard et al. | 102—98 |
| 3,084,600 | 4/1963 | Walker | 102—93 |
| 3,088,273 | 5/1963 | Adelman et al. | 60—35.6 |
| 3,137,126 | 6/1964 | Madison | 60—35.6 |
| 3,158,061 | 11/1964 | Lager | 89—1.7 |
| 3,167,912 | 2/1965 | Ledwith | 60—35.6 |

SAMUEL W. ENGLE, *Primary Examiner.*

BENJAMIN A. BORCHELT, *Examiner.*